United States Patent
Ludwig

(10) Patent No.: US 10,396,986 B2
(45) Date of Patent: Aug. 27, 2019

(54) METHOD FOR GENERATING A SECRET BETWEEN USERS OF A NETWORK, AND USERS OF THE NETWORK WHICH ARE CONFIGURED FOR THIS PURPOSE

(71) Applicant: Robert Bosch GmbH, Stuttgart (DE)

(72) Inventor: Stephan Ludwig, Renningen-Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 15/235,265

(22) Filed: Aug. 12, 2016

(65) Prior Publication Data
US 2017/0048064 A1    Feb. 16, 2017

(30) Foreign Application Priority Data
Aug. 14, 2015   (DE) .................. 10 2015 215 569

(51) Int. Cl.
*H04L 29/06*  (2006.01)
*H04L 9/08*  (2006.01)

(52) U.S. Cl.
CPC .......... *H04L 9/0875* (2013.01); *H04L 63/061* (2013.01); *H04L 2209/80* (2013.01)

(58) Field of Classification Search
CPC .. H04L 9/0875; H04L 63/061; H04L 2209/80
USPC ....................................... 713/150
See application file for complete search history.

(56) References Cited

U.S. PATENT DOCUMENTS

| 7,333,611 B1* | 2/2008 | Yuen ............... H04B 10/70 380/256 |
| 8,090,101 B2* | 1/2012 | Ye .................. H04L 63/061 380/44 |
| 8,280,046 B2* | 10/2012 | Rudolf ............. H04L 9/0841 380/255 |

(Continued)

FOREIGN PATENT DOCUMENTS

| DE | 10 2012 215326 A1 | 3/2014 |
| WO | 1996/022376 A2 | 7/1996 |
| WO | 2006/081122 A2 | 8/2006 |

OTHER PUBLICATIONS

Brassard et al., "Secret-Key Reconciliation by Public Discussion", Advances in Cryptology, Eurocrypt'93, 1994, pp. 410-423.

(Continued)

*Primary Examiner* — John B King
(74) *Attorney, Agent, or Firm* — Norton Rose Fulbright US LLP; Gerard Messina

(57) ABSTRACT

A method for generating a shared secret between a first user and a second user of a network is provided. The first user receives from the second user a first training sequence via a communication link between the first user and the second user. The first user ascertains at least one first value for at least one physical property of the communication link, and determines a portion of the shared secret as a function of the first value. A comparison of the first value to at least one threshold takes place for determining the portion of the shared secret. The first user transmits the first training sequence to the second user via the communication link, and adapts the transmission parameters of the first training sequence as a function of the position of the first value relative to the threshold.

21 Claims, 7 Drawing Sheets

(56) References Cited

U.S. PATENT DOCUMENTS

| | | | | |
|---|---|---|---|---|
| 8,744,082 B2* | 6/2014 | Ly | H04L 9/0875 | 341/54 |
| 8,989,764 B2* | 3/2015 | Patwari | G01S 5/0252 | 455/456.1 |
| 2006/0105740 A1* | 5/2006 | Puranik | H04M 3/16 | 455/410 |
| 2007/0036353 A1* | 2/2007 | Reznik | H04B 7/0434 | 380/30 |
| 2007/0177729 A1* | 8/2007 | Reznik | H04K 1/00 | 380/44 |
| 2009/0183248 A1* | 7/2009 | Tuyls | H04L 9/3278 | 726/9 |
| 2010/0067701 A1* | 3/2010 | Patwari | H04L 9/0838 | 380/279 |
| 2011/0135088 A1* | 6/2011 | Rudland | H04L 9/0841 | 380/46 |
| 2011/0280397 A1* | 11/2011 | Patwar | H04L 63/06 | 380/44 |
| 2013/0173910 A1* | 7/2013 | Hong | H04W 12/04 | 713/153 |
| 2014/0281554 A1* | 9/2014 | Maletsky | H04L 9/14 | 713/175 |
| 2015/0135293 A1* | 5/2015 | Mookiah | H04W 12/12 | 726/7 |
| 2017/0048064 A1* | 2/2017 | Ludwig | H04L 9/0875 | |

OTHER PUBLICATIONS

Dodis et al., "Fuzzy Extractors: How to Generate Strong Keys from Biometrics and Other Noisy Data", Advances in Cryptology—EUROCRYPT 2004, Lecture Notes in Computer Science, vol. 3027, 2004, pp. 523-540.

Wallace, "Secure Physical Layer Key Generation Schemes: Performance and Information Theoretic Limits," IEEE International Conference on Communications, 2009, 5 pages.

Shehadeh et al., "On Improving the Robustness of Physical-layer Key Extraction Mechanisms against Delay and Mobility", Wireless Communications and Mobile Computing Conference, 2012, 6 pages.

* cited by examiner

METHOD FOR GENERATING A SECRET BETWEEN USERS OF A NETWORK, AND USERS OF THE NETWORK WHICH ARE CONFIGURED FOR THIS PURPOSE

RELATED APPLICATION INFORMATION

The present application claims priority to and the benefit of German patent application no. 10 2015 215 569.2, which was filed in Germany on Aug. 14, 2015, the disclosure of which is incorporated herein by reference.

FIELD OF THE INVENTION

The present invention relates to the generation of a shared secret between users of a network, in particular for safeguarding data transmissions between the users.

BACKGROUND INFORMATION

Secure communication between various devices is becoming ever more important in an increasingly interconnected world, and in many applications represents an essential requirement for the acceptance, and thus also for the commercial success, of the applications in question. Depending on the application, this includes various protection objectives, such as protecting the confidentiality of the data to be transmitted, mutual authentication of the participating nodes, or ensuring data integrity.

For achieving these protection objectives, suitable cryptographic methods are typically used, which in general may be divided into two different categories: symmetrical methods, in which the sender and the receiver have the same cryptographic key, and asymmetrical methods, in which the sender encrypts the data to be transmitted with the public key (i.e., possibly also known by a potential attacker) of the receiver; however, the decryption can take place only with the associated private key, which ideally is known only by the receiver.

Asymmetrical methods have the disadvantage, among other things, that they generally have a very high level of computational complexity. Therefore, they are not very suitable for resource-limited nodes, such as sensors, actuators, or the like, which usually have only relatively low computing power and small memory capacity, and which are intended to operate in an energy-efficient manner, for example based on battery operation or the use of energy harvesting. In addition, frequently only a limited bandwidth is available for data transmission, which makes the exchange of asymmetrical keys having lengths of 2048 bits, or even more, unattractive.

In contrast, in symmetrical methods it must be ensured that both the receiver and the sender have the same key. The associated key management generally represents a very challenging task. In the area of mobile communication, keys are introduced into a mobile telephone with the aid of SIM cards, for example, and the associated network may then associate the corresponding key with the unique identifier of a SIM card. In contrast, in the case of wireless LANs, the key to be used is usually entered manually (generally by entering a password) in the configuration of a network. However, such key management quickly becomes very complicated and impracticable when a very large number of nodes is present, for example in a sensor network or other machine-to-machine communication systems. In addition, changing the key to be used, if possible at all, often requires a great deal of effort.

For this reason, for quite some time new approaches under the heading of "physical layer security" have been investigated and developed, with the aid of which keys for symmetrical methods may be automatically generated based on the transmission channels between the involved nodes. The ascertainment of random numbers or pseudorandom numbers from channel parameters is discussed in WO 1996/023376 A2, for example, and the generation of secret keys from channel parameters is discussed in WO 2006/081122 A2 and DE 10 2012 215326 A1. Pilot signal sequences (which may be known on both sides) generally are initially transmitted from the first node to the second node, and pilot signal sequences are then transmitted from the second node to the first node. The particular receiver may estimate channel properties from the received pilot signal sequences, and on this basis may derive suitable parameters for generating a key. An important step is the so-called quantization, i.e., the derivation of a digital bit sequence from the estimated channel properties.

Likewise, various algorithms for quantization and protocols for the key and secret reconciliation (information reconciliation) between the users have already been provided. Known quantization methods are usually based on one or multiple thresholds which may be defined based on the distribution of the obtained measured values. A quantized value is associated with a measured value, depending on which side of the threshold the measured value lies. The quantization generally takes place independently on both sides (in both users) with identical quantization methods (and identical thresholds). In practice, the resulting sequence is generally not identical for the users due to measuring inaccuracies and fluctuations in the channel properties, for which reason a reconciliation of the ascertained secret information is advantageous. This reconciliation is based essentially on the exchange of information which allows what may be few conclusions to be drawn concerning the actual cryptographic key or the actual secret between the users.

For example, the CASCADE protocol, described among others in the publication by Brassard, Salvail: "Secret-Key Reconciliation by Public Discussion," Advances in Cryptology, 1994, as well as error correction codes, described among other things in the publication by Y. Dodis, R. Ostrovsky, L. Reyzin, A. Smith: "Fuzzy Extractors: How to Generate Strong Keys from Biometrics and Other Noisy Data," Advances in Cryptology—EUROCRYPT 2004, Lecture Notes in Computer Science, Volume 3027, 2004, pp. 523-540, may be used for such a reconciliation. The parity bits exchanged during such a reconciliation reveal information with which an attacker may deduce portions of the secret key. The secret key thus loses quality and entropy. In the case of a "brute-force" attack, the attacker does not have to test as many combinations, since he/she already knows portions of the key. To keep the quantity of exchanged information low, it may be important to use robust quantization methods. The more robust the quantization method, the fewer portions of a secret (generally bits of a particular created bit sequence) are different between the users, and the fewer pieces of information have to be exchanged between the users during a reconciliation of the secret.

A quantization method is described in Wallace: "Secure Physical Layer Key Generation Schemes: Performance and Information Theoretic Limits," IEEE International Conference on Communications, 2009. Two different quantizers (or quantization methods) per party are used. One party determines, for each measured value of the channel, which of the two quantizers is better suited, i.e., for which the measured value is farther from the interval limit, and quantizes using this quantizer. The selection is communicated to the other party.

Another quantization method is described in Shehadeh, Alfandi, Hogrefe: "On Improving the Robustness of Physical-layer Key Extraction Mechanisms against Delay and Mobility," Wireless Communications and Mobile Computing Conference, 2012. The quantization of the complex-valued measured values takes place in each case on one of a number of predetermined constellation points, each of which is associated with a bit sequence. The association with constellation points is mapped by areas in the complex plane whose boundaries correspond to the above-mentioned thresholds. The deviation from the constellation point (but not the constellation point itself) is transmitted from one party to the other. This party then correspondingly changes its measured value. The transmission of the deviation does not allow a conclusion to be drawn concerning the constellation point itself (or thus, concerning the ascertained bit sequence).

SUMMARY OF THE INVENTION

The present invention relates to methods according to the independent method claims, and to users on a network or networks which are configured for carrying out one of the methods. Moreover, the present invention relates to a computer program which is configured for carrying out one of the methods.

It is provided that two users of a network ascertain a shared secret (in particular a shared secret bit sequence) from properties of a transmission channel between the users. The first user ascertains one portion of the secret by receiving a training sequence from the second user and ascertains the properties of the transmission channel. Values for the ascertained properties are a function of transmission parameters (parameters of the transmission signal) of the training sequence. Via a quantization, in particular by a comparison of the ascertained properties with one or multiple threshold values, the first user determines the portion of the secret, which may be as a bit sequence. In a continuation of the method, it is provided that the first user likewise transmits the training sequence to the second user, which then carries out a corresponding quantization and derivation of the secret.

In order to provide a large number of matching portions of the secret (which may be matching bits in the shared secret bit sequence), it is now provided that the first user adapts the transmission of the training sequence, in particular the transmission signal, as a function of the position of the ascertained values for the physical properties of the transmission channel relative to at least one threshold. Transmission parameters such as an amplitude or phase (equivalent low pass representation) of the transmission signal are adapted. In this way, the first user may manipulate the expected result in the second user as desired, thus allowing a flexible quantization method. For this purpose, information may be stored in the first user concerning how a change in transmission parameters affects values for the physical property of the transmission channel during the transmission of the training sequence. In the embodiment of the method, the adaptation takes place in such a way that the threshold value comparisons may be unambiguous; i.e., the values compared to the thresholds may be far from the threshold, or the nearest thresholds.

A much more robust, and thus more noise-tolerant, quantization is achieved by such an adaptation of the training sequence (or also the pilot signal sequence). High error rates in the resulting secret sequences are thus avoided, and less information has to be disclosed during an optional subsequent key or secret reconciliation. Compared to known, robust quantization methods, for this purpose no further information exchange between the users (for example, via a distance between the value and the threshold, or via a quantization method) is necessary. The method is also suitable for real-valued measured values, and also for multiple thresholds in the amplitude and/or phase (for example, higher-level quadrature amplitude constellation points).

The method is likewise so flexible that it may be applied regardless of the quantization method used, and the number and the exact values of the thresholds. However, the participating users advantageously operate with the same (negotiated or predetermined) quantization method, and with the same thresholds.

In one embodiment, the users create a shared symmetrical key based on the shared secret (in particular the shared bit sequence), and use it as the basis of an encrypted communication.

The methods may be implemented particularly well in wireless networks with reception strength, in particular received signal strength indicator (RSSI), phase shift, attenuation, or a combination of these variables, as a physical property, and with an adaptation of the transmission parameters of the training sequence by changing an amplitude or a phase of the transmission signal, or a combination.

The present invention is described in greater detail below with reference to the appended drawings, and based on exemplary embodiments.

DETAILED DESCRIPTION

The methods described herein are suited for safeguarding a network made up of at least two devices which communicate with one another, which may be via wireless communication links or channels. The devices may be linked to one another via point-to-point connections or in some other form of communication network.

Figure 1:
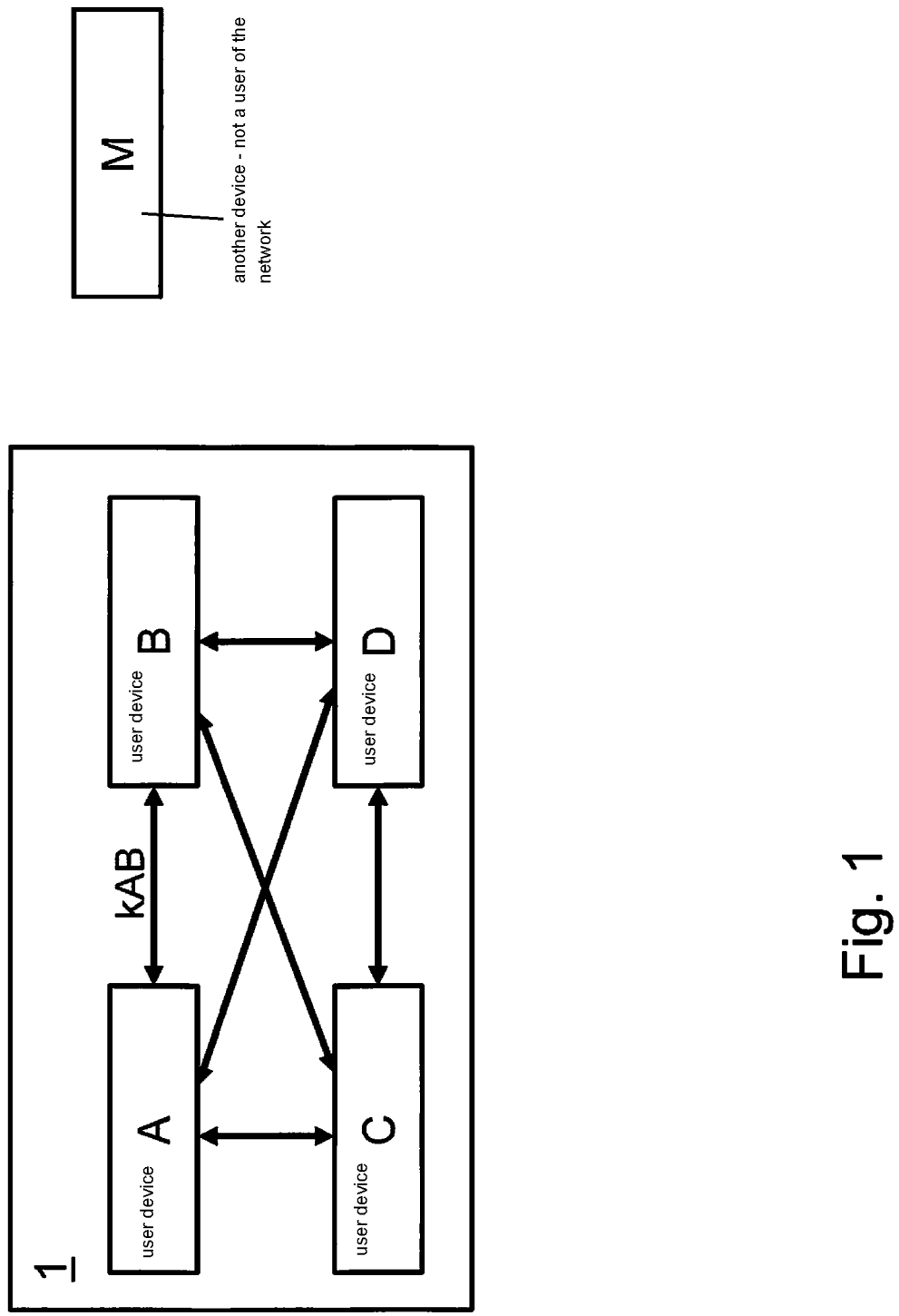
FIG. 1 shows an example of a network with network users, and a unit which is not a user of the network.

FIG. 1 shows one possible design of a communication network. Multiple devices (here: users A, B, C, D) are linked to one another in a communication network 1, user A being linked to user B via a communication link kAB, for example. Another device M is also shown which is not a user of the network, and from which the network and in particular the communication of its users must be safeguarded. The devices or users A, B, C, D are in particular small, resource-limited sensors or actuators.

Figure 2:
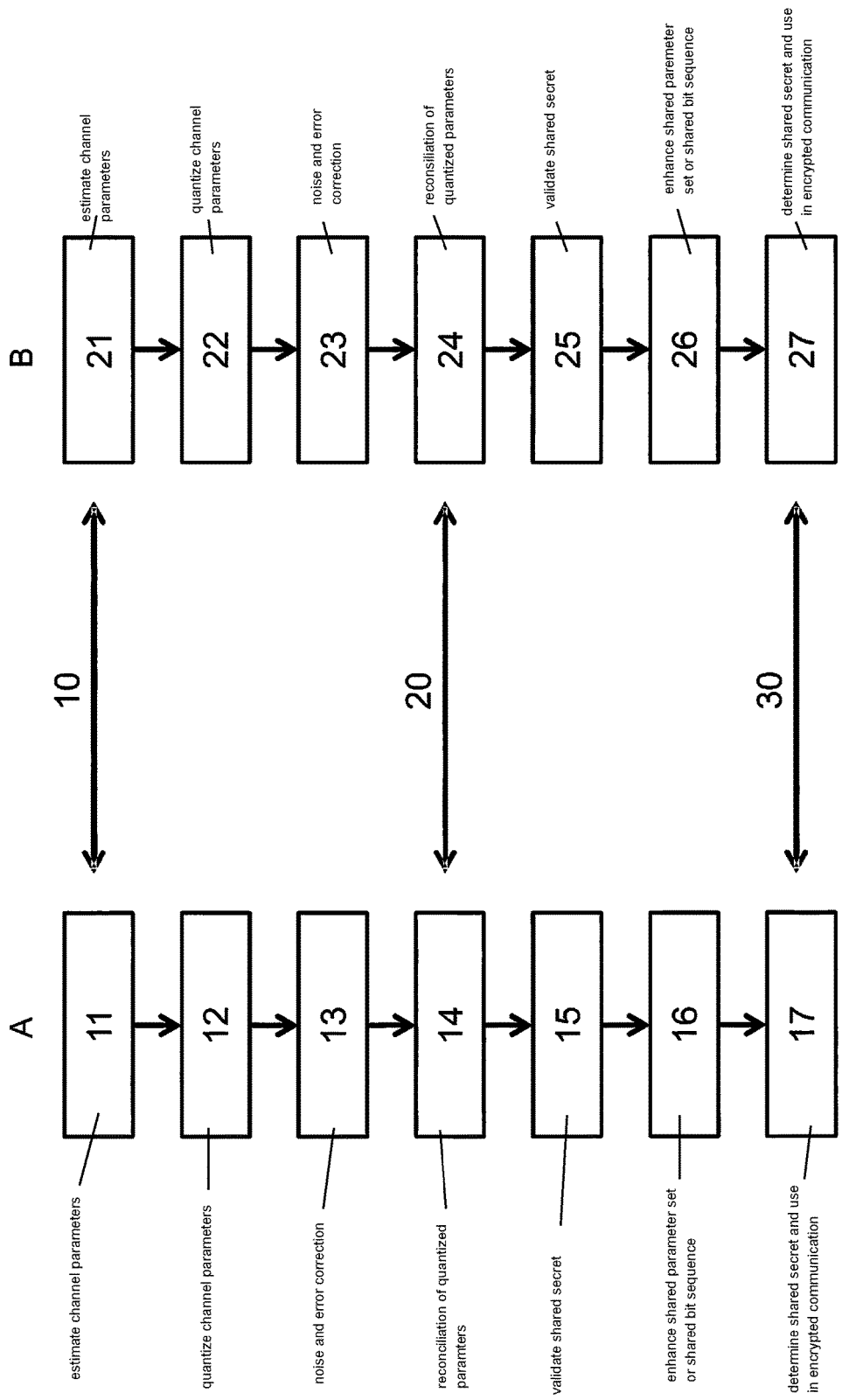
FIG. 2 schematically shows steps of an example of a method for key generation between two users of a network, based on properties of the communication channel between the users.

In so-called physical layer security methods, shared secrets (for example, shared bit sequences as the basis for symmetrical keys) may be derived from physical properties of the shared communication channel and optionally negotiated by two devices. Based on physical properties of their shared transmission channel, the devices each ascertain values, in particular a bit sequence, on which they base the secret which is ascertained in each case. Use is made of the reciprocity and the inherent randomness of the transmission channel between the participating devices. This may proceed, for example, as described in greater detail below and shown in FIG. 2.

The two devices A and B estimate a certain number of channel parameters, possibly also over time, in steps 11 and 21. For example, phase shifts and attenuations due to the transmission channel as well as variables derived therefrom may be used as channel parameters. The received signal strength indicator (RSSI), for example, represents a common indicator for the reception field strength of wireless communication applications, and may be used for these purposes. Training sequences which are known to both users are transmitted between the users in a step 10 for ascertaining the channel parameters.

These channel parameters are appropriately quantized by both devices in steps 12 and 22. Measures for noise and error reduction, for example by using error-correcting codes, then may follow in steps 13 and 23.

A reconciliation of the quantized channel parameters between the devices, which may be use a public protocol, then takes place in steps 14 and 24 with the aid of suitable mechanisms. This is often necessary due to the fact that initially, the two devices generally have not ascertained identical parameter sets on account of measuring inaccuracies, noise, interferences, etc. The reconciliation takes place by exchanging information in step 20, and should be configured in such a way that a potential attacker who may eavesdrop on the exchanged data is not easily able to use it for deducing the quantized channel parameters. For this purpose, for example parity bits may be exchanged between the devices, or error-correcting codes may likewise be used.

Optionally, a validation of the shared secret (for example, an entropy estimation) may also be carried out in steps 15 and 25, and an enhancement of the shared parameter set or the shared bit sequence thus determined (for example, by compression via hash value formation) may be carried out in steps 16 and 26. Lastly, both devices, based on channel parameters which have been quantized, processed, and reconciled in this way, determine a shared secret in steps 17 and 27, which they may optionally use as a key as the basis for an encrypted communication in step 30.

It is assumed that a potential attacker is situated a far enough distance away from the two devices in which the shared secret is to be created. The distance should be at least within an order of magnitude of the so-called coherence length, which in standard wireless communication systems is in the range of a few centimeters. The attacker thus sees other (independent) transmission channels to these two devices, and cannot easily reconstruct the same shared secret.

In the described methods, it is assumed that the transmission channels between the devices have sufficient fluctuations of their channel properties to be able to derive suitable channel parameters (in particular, sufficient randomness properties) therefrom which are suitable as the basis for generating a shared secret in the users. These fluctuations may occur in particular in the time range as well as in the frequency range, and for multi-antenna systems, also in the spatial range. However, it is also assumed that the channel properties have a sufficiently high correlation over short time periods so that data transmissions may take place in both directions, on the basis of which the particular devices, despite a time offset, may estimate channel properties which are similar enough so that channel parameters with sufficient similarity may be obtained, from which identical shared secrets may be obtained.

In known quantization methods, a value from the ascertainment of the physical property of the transmission channel may fall on the boundary between two quantization intervals or very near such a boundary, which in all likelihood will result in dissimilar secret portions or dissimilar bit sequences for the two users. In turn, this requires more information to be exchanged within the scope of the secret reconciliation. However, as described above, the quantity of information to be exchanged should be kept small.

Figure 3:
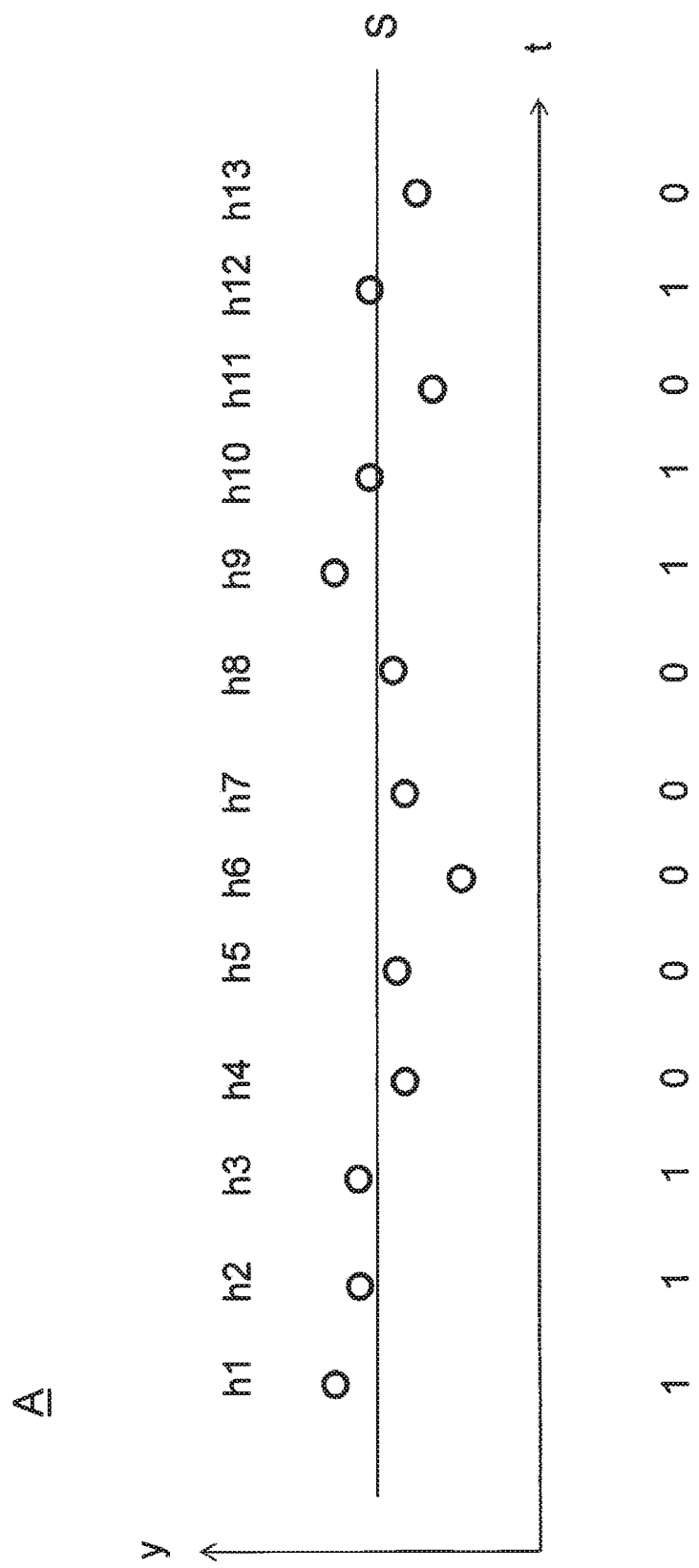
FIG. 3 schematically shows a quantization of measured values based on a comparison to a threshold value.

FIG. 3 shows an example of a quantization. Over time period (t), user A determines values $h1$ through $h13$ for a physical variable y, based on the channel properties of the transmission channel to user B. These are based on transmissions of training sequences (or pilot signal sequences) from user B to user A. For each training sequence, user A ascertains a value h for property y, and compares value h to threshold S. If value h is above threshold S, user A quantizes the value as 1, and if value h is below threshold S, user A quantizes the value as 0. The user thus obtains a bit sequence of measured channel properties.

According to the method described above, user A, after receiving a training sequence from user B, may transmit on its part the training sequence to user B, and user B may carry out a corresponding quantization. However, it is conspicuous that values $h8$, $h10$, and $h12$ are very near threshold S. Due to even small fluctuations and measuring inaccuracies, for these measured values, user B could therefore arrive at different quantization results than user A (0 instead of 1, or 1 instead of 0). To avoid this situation, it is now provided that user A adapts the transmission signals of the transmissions of the training sequences, on which these measured values are based, in such a way that the expected measured values of user B are farther from the threshold in the direction of the quantization ascertained by user A. For the example in which physical property y is a transmission strength of the communication link (with increasing transmission strengths plotted at the top of the diagram), for example for the training sequence transmission on which value $h8$ is based, user A could decrease the transmission signal strength as the transmission parameter, and for the training sequence transmission on which values $h10$ and $h12$ are based, user A could increase the transmission signal strength as the transmission parameter.

Figure 4:
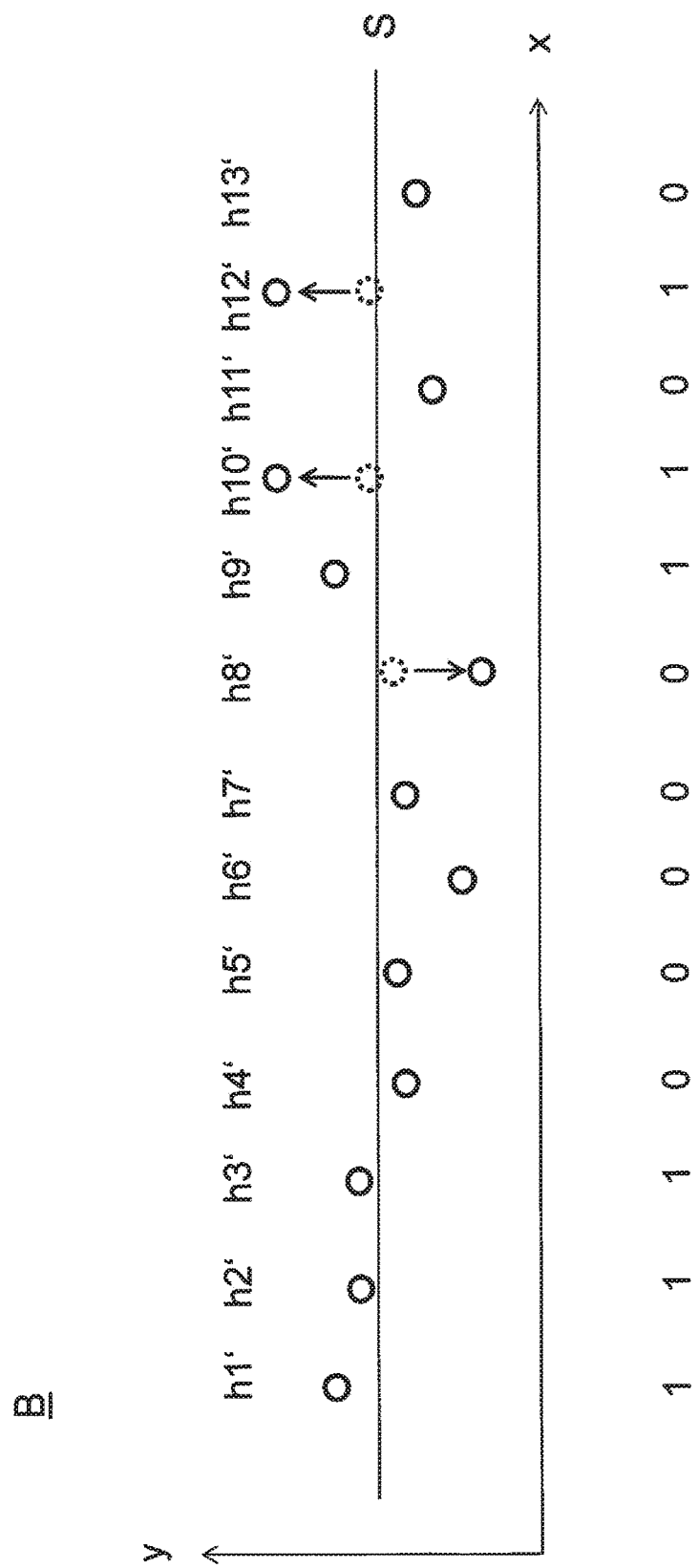
FIG. 4 schematically shows a quantization of measured values based on a comparison to a threshold value, individual measured values being changed in comparison to FIG. 3 by adapting the underlying transmission signals.

FIG. 4 shows the effect of such an adaptation on the quantization by user B. Corresponding values $h1'$ through $h13'$ determined by user B, after the threshold value comparison, result in the same bit sequence as in user A. Due to the adaptations by user A of the training sequence transmissions corresponding to the transmission parameters, values $h8'$, $h10'$, and $h12'$, which are critical in the estimation, are far enough away from threshold value S that, even with fairly small value fluctuations or measuring inaccuracies, a quantization which differs from user A, and thus, different bit sequences, are not to be expected.

Figure 5:
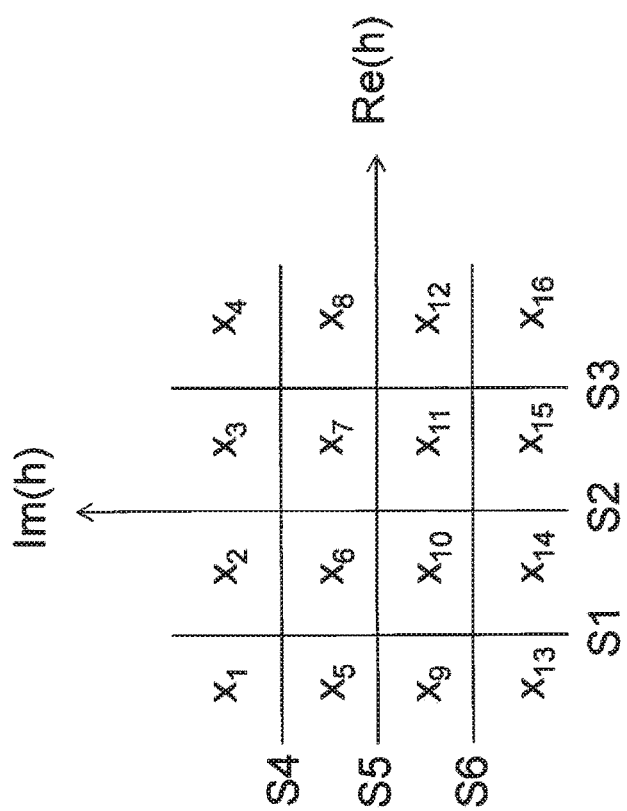
FIG. 5 schematically shows an example of a two-dimensional quantization with six threshold values.

FIG. 5 shows a quantization method having two dimensions and a total of six thresholds (three per dimension). In this example, a complex measured value h having an imaginary part Im(h) and a real part Re(h) is assumed. Thresholds S1, S2, S3 are established for real part Re(h), and thresholds S4, S5, S6 are established for imaginary part Im(h). Thresholds S1 through S6 define a total of 16 areas in the complex plane, with each of which a bit sequence may be associated (for example, 0000 to 1111). If a measured value h=Re(h)+Im(h) falls in a certain area, within the scope of the quantization it is assigned the corresponding bit sequence. The midpoints of such areas may be referred to as constellation points.

Figure 6:
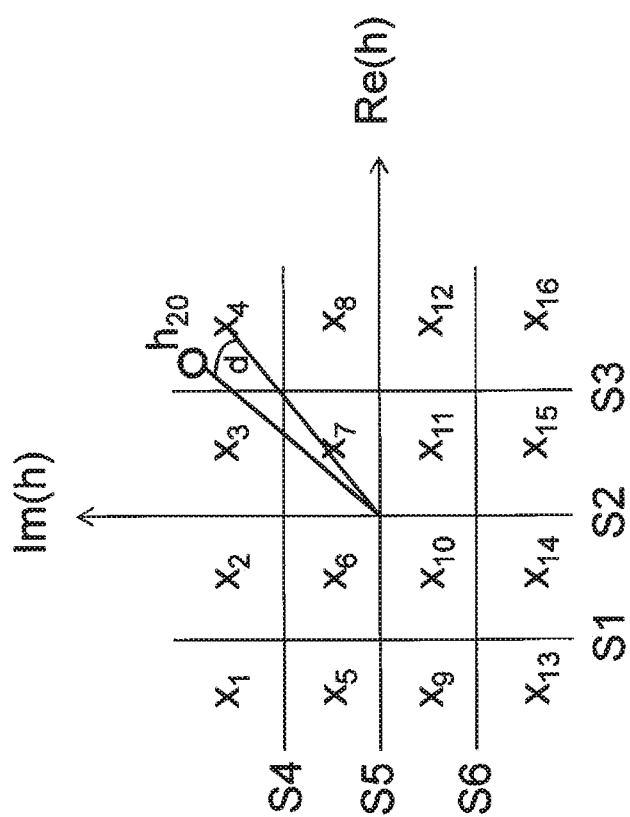
FIG. 6 shows a method for generating a shared secret according to the related art.

If a measured value h20 is not centrally situated in one of the areas, as shown in FIG. 6, it is still associated with the bit sequence corresponding to the area. However, if the value is near a threshold, i.e., near a boundary of an adjacent area, once again there is a risk of a different quantization between user A and user B.

In the quantization method for complex-valued measured values known from the related art described above, user A therefore sends to user B, in addition to a training sequence, also the information concerning how far from the center of the area the measured value is situated (in the present case, the distance of h20 from the center of area x4), and in particular via a transmitted phase difference d, so that user B may adapt its corresponding measured value. However, this results in additional data transmissions from user A to user B, which should be prevented.

Figure 7:
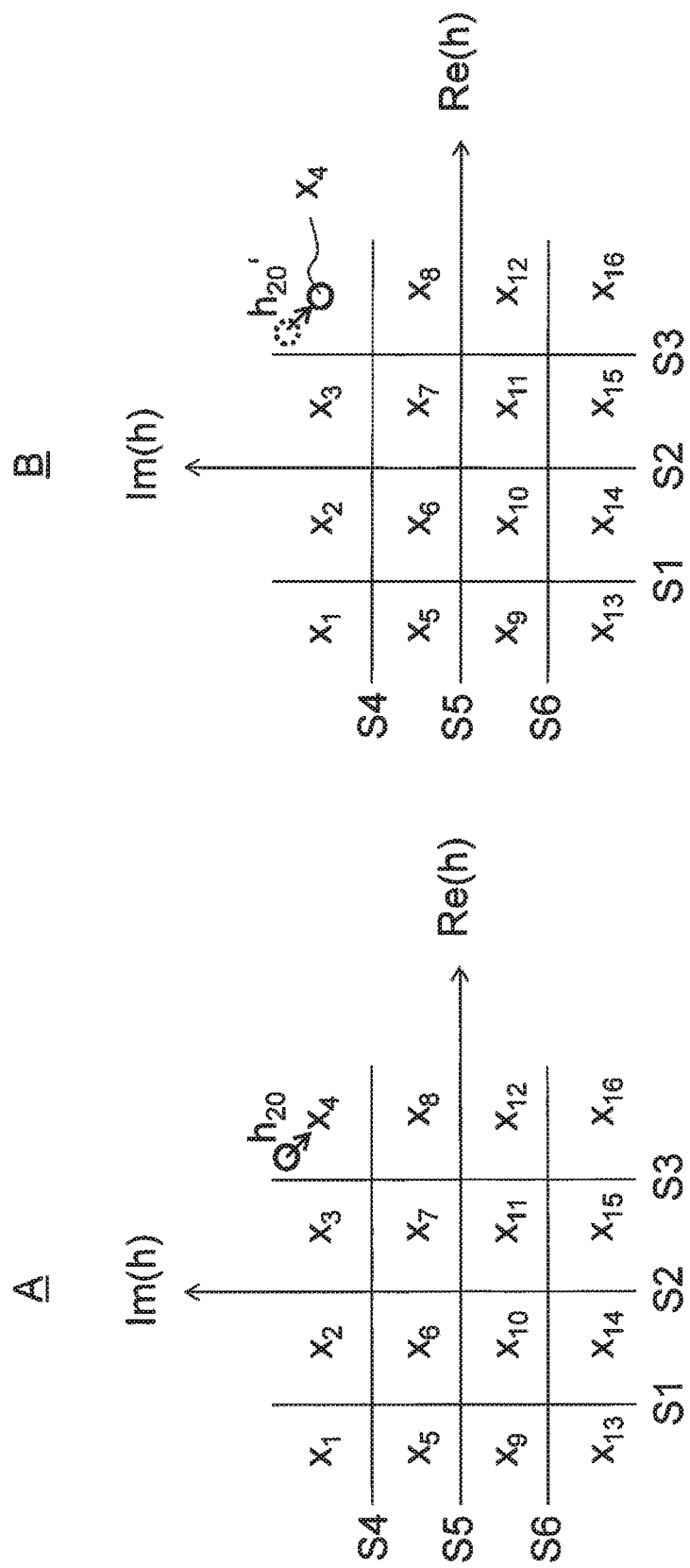
FIG. 7 shows a method for generating a shared secret by adapting the transmission signal of a training sequence transmission for a more robust quantization.

Therefore, FIG. 7 shows the method provided here, for the case of multidimensional quantization.

User B transmits a known standard training sequence (training sequence or pilot signal sequence) via the shared transmission channel to user A, which uses it, together with the reception signal, to estimate the transmission channel. Ascertained channel estimated value h20 is noisy due to the receiver noise. In this example, the channel estimated value (the measured value) is complex-valued and scalar. The channel estimated value may generally be real-valued, and a vector. In the case of real values, the quantization areas degrade into quantization intervals, as shown above. In the case of vectors, each element is to be considered individually.

User A now quantizes measured value h20 to the nearest constellation point, in the present case, the center of area x4. The bit sequence belonging to this area or to its constellation point now forms a sequence on which a shared secret or a portion of the secret with user B is to be based.

User A then determines an adaptation of the transmission signal parameters of the transmission of the corresponding standard training sequence to user B as a function of the relative position of the measured value (h20) with respect to a threshold, for example via the values of constellation point x4 and of measured value h20. The position with respect to the threshold may thus be used in the adaptation, via a distance from the threshold itself or also via the value of a point (a constellation point, for example) that is defined via thresholds. For example, user A may determine factor x4/h20, multiply standard training sequence B by this factor, and transmit the result B'=x4/h20*B to party 2. This party estimates the channel (measured value h20') with the aid of this modified training sequence. Since the channel between both parties is reciprocal, the measured value of user B corresponds to (h'=x4/h20*h+n), where n stands for the receiver noise. The expected value of h' is thus exactly on the constellation point, which means the greatest possible robustness/tolerance against noise for user B.

When the measurement of the channel properties takes place within the scope of a physical layer security by two devices, i.e., in chronological succession (so-called time division duplex), the first device may first quantize its measured value, and subsequently manipulate the measuring signal for the second device, by changing a transmission signal, in such a way that its measured value falls in the center of the same quantization interval or area in which the first party has detected its corresponding measured value. Due to this change, no information concerning the resulting secret is revealed to an eavesdropping attacker.

In one alternative embodiment, user A does not necessarily have to quantize to the nearest constellation point, and instead may quantize to any other constellation point and correspondingly adapt the transmission signal to the training sequence, resulting in the same constellation point for user B for the measured value in question. However, it is meaningful to quantize to the point that is then nearest, since the change in the transmission signal is then smallest.

To further increase the robustness, the quantization areas may be separated from one another by a protection area. The provided procedure is combinable with multiplex methods in the spatial direction and/or frequency direction.

The provided protocol may be used in a particularly advantageous manner in all networked products with a wireless interface, in particular devices of the so-called Internet of Things.

What is claimed is:

1. A method for generating a shared secret between a first user device and a second user device of a network, the method comprising:
   receiving, at the first user device, from the second user device, a first training sequence via a communication link between the first user and the second user;
   based on the receiving of the first training sequence, ascertaining, by the first user device, at least one first value for at least one physical property of the communication link;
   determining, by the first user device, the shared secret as a function of the first value;
   comparing the first value to at least one threshold for determining the shared secret;
   adapting, by the first user device, transmission parameters of a second training sequence as a function of a position of the first value relative to the threshold;
   transmitting, from the first user device, the second training sequence to the second user device via the communication link using the adapted transmission parameters; and
   communicating, by the first user device with the second user device over a communication medium, by encrypted communication, the shared secret being the basis for the encrypted communication.

2. The method of claim 1, wherein the adapting includes the first user device adapting the transmission parameters of the second training sequence as a function of a distance of the first value from the threshold.

3. The method of claim 1, wherein the adapted transmission parameters are adapted in such a way that an ascertained value for the physical property of the communication link diverges from the threshold during the transmission.

4. The method of claim 1, wherein the first user device and the second user device derive a shared symmetrical key from the shared secret.

5. The method of claim 4, wherein the first user device and the second user device use the shared symmetrical key as the basis of an encrypted communication.

6. The method of claim 1, wherein the network is wireless.

7. The method of claim 1, wherein the physical property represents a reception strength, in particular a received signal strength indicator, or a phase shift or an attenuation, or a variable that is derived from one or multiple of these variables.

8. The method of claim 1, wherein the transmission parameters are adapted by changing an amplitude or a phase of the transmission signal, or by changing the amplitude and a phase of the transmission signal.

9. The method as recited in claim 1, further comprising:
receiving, by the second user device from the first user device, the second training sequence that was transmitted from the first user device using the adapted transmission parameters;
based on the receiving of the second training sequence from the first user device, ascertaining, by the second user device, at least one second value for at least one physical property of the communication link;
determining, by the second user device, the shared secret as a function of the second value; and
communicating by the second user device with the second user device over the communication medium, by encrypted communication, the shared secret being the basis for the encrypted communication.

10. The method as recited in claim 1, wherein the adapted transmission parameters include an adapted transmission signal strength.

11. The method as recited in claim 1, wherein the communication link is a wireless communication channel.

12. The method as recited in claim 1, wherein the encrypted communication is encrypted using the shared secret.

13. The method as recited in claim 1, wherein the transmission parameters of the first training sequence includes a transmission signal strength, wherein the adapting includes changing the transmission signal strength, and wherein the transmitting of the second training sequence includes transmitting the second training sequence using the changed transmission signal strength.

14. The method as recited in claim 1, wherein the transmission parameters include at least one of amplitude and phase, wherein the adapting includes changing the at least one of the amplitude and phase, and wherein the transmitting of the second training sequence includes transmitting the second training sequence using the changed at least one of the amplitude and phase.

15. The method as recited in claim 1, wherein the communication medium is a wireless communication channel.

16. A user device on a network, the user device configured for generating a shared secret between a first user device and a second user device of a network, by performing the following:
receiving, at the first user device, from the second user device a first training sequence via a communication link between the first user device and the second user device;
based on the receiving of the first training sequence, ascertaining, by the first user device, at least one first value for at least one physical property of the communication link;
determining, by the first user device, the shared secret as a function of the first value;
comparing the first value to at least one threshold for determining the shared secret;
adapting, by the first user device, transmission parameters of a second training sequence as a function of a position of the first value relative to the threshold;
transmitting, from the first user device, the second training sequence to the second user device via the communication link using the adapted transmission parameters; and
communicating, by the first user device with the second user device over a communication medium, by encrypted communication, the shared secret being the basis for the encrypted communication;
wherein the user device includes a computer.

17. A network, comprising:
at least two devices;
wherein each of the at least two devices includes a first user device including a computer, each of the at least two devices configured to generate a shared secret between the first user device and a second user device of a network, by performing the following:
receiving, at the first user device, from the second user device a first training sequence via a communication link between the first user and the second user;
based on the receiving of the first training sequence, ascertaining, by the first user device, at least one first value for at least one physical property of the communication link;
determining, by the first user device, the shared secret as a function of the first value;
comparing the first value to at least one threshold for determining the shared secret;
adapting, by the first user device, transmission parameters of a second training sequence as a function of a position of the first value relative to the threshold;
transmitting, from the first user device, the second training sequence to the second user device via the communication link using the adapted transmission parameters; and
communicating, by the first user device with the second user device over a communication medium, by encrypted communication, the shared secret being the basis for the encrypted communication.

18. The network of claim 17, wherein the adapting includes the first user device adapting the transmission parameters of the second training sequence as a function of a distance of the first value from the threshold.

19. A machine-readable memory medium having a computer program, which is executable by a processor, comprising:
a program code arrangement having program code for generating a shared secret between a first user device and a second user device of a network, by performing the following:
receiving, at the first user device, from the second user device a first training sequence via a communication link between the first user device and the second user device;
based on the receiving of the first training sequence, ascertaining, by the first user device, at least one first value for at least one physical property of the communication link;
determining, by the first user device, the shared secret as a function of the first value;
comparing the first value to at least one threshold for determining the shared secret;
adapting, by the first user device, transmission parameters of a second training sequence as a function of a position of the first value relative to the threshold;

transmitting, from the first user device, the second training sequence to the second user via the communication link using the adapted transmission parameters; and communicating, by the first user device with the second user device over a communication medium, by encrypted communication, the shared secret being the basis for the encrypted communication.

20. A network, comprising:

a first user device configured to:
- receive, at the first user device, from a second user device a first training sequence via a communication link between the first user device and the second user device,
- based on the receiving of the first training sequence, ascertain, by the first user device, at least one first value for at least one physical property of the communication link,
- determine, by the first user device, the shared secret as a function of the first value,
- compare the first value to at least one threshold for determining the shared secret,
- adapt, by the first user device, transmission parameters of a second training sequence as a function of a position of the first value relative to the threshold, and
- transmit, from the first user device, the second training sequence to the second user via the communication link using the adapted transmission parameters; and the second user device configured to:
- receive, by the second user device from the first user device, the second training sequence that was transmitted from the first user device using the adapted transmission parameters,
- based on the receiving of the second training sequence from the first user device, ascertaining, by the second user device, at least one second value for at least one physical property of the communication link, and
- determine, by the second user device, the shared secret as a function of the second value;

wherein the first user device and the second user device are designed to communicate over a communication medium by encrypted communication with each other, the shared secret being the basis of the encrypted communication;

wherein each of the first user device and the second user device includes a computer.

21. The network as recited in claim 20, wherein the adapted transmission parameters include an adapted transmission signal strength.

* * * * *